July 13, 1965  H. O. CORBETT  3,193,879
EXTRUSION DEVICE
Filed Oct. 23, 1962  2 Sheets-Sheet 2
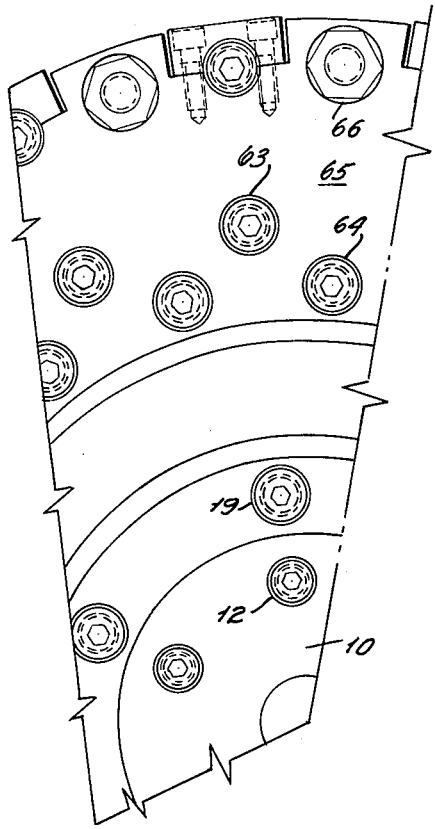
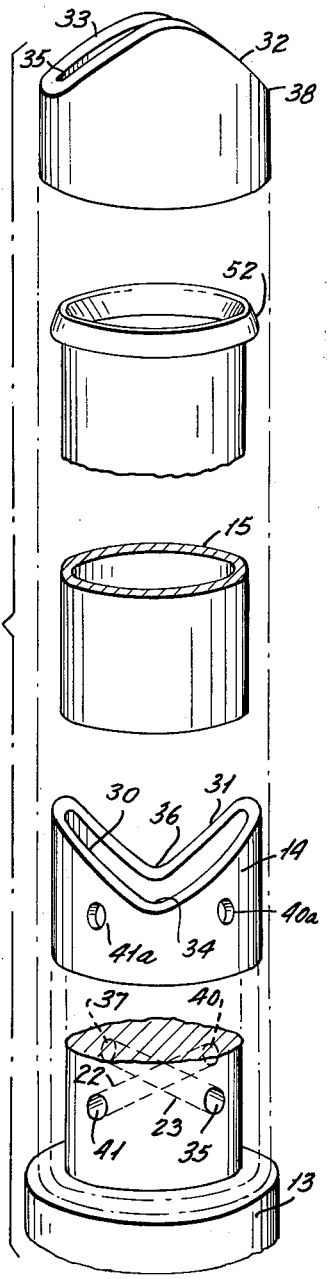
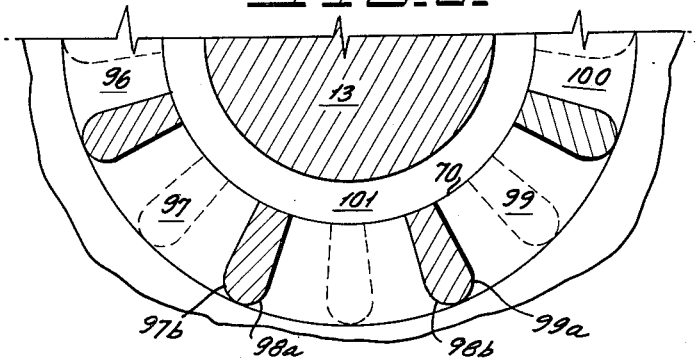
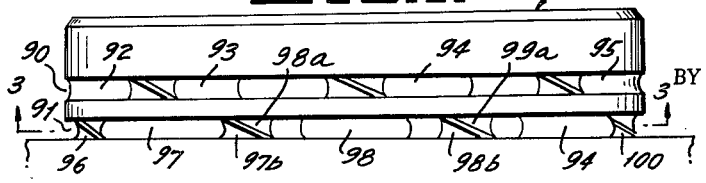
HERBERT O. CORBETT
INVENTOR.
BY Lawrence Rosen United States Patent Office 3,193,879
Patented July 13, 1965

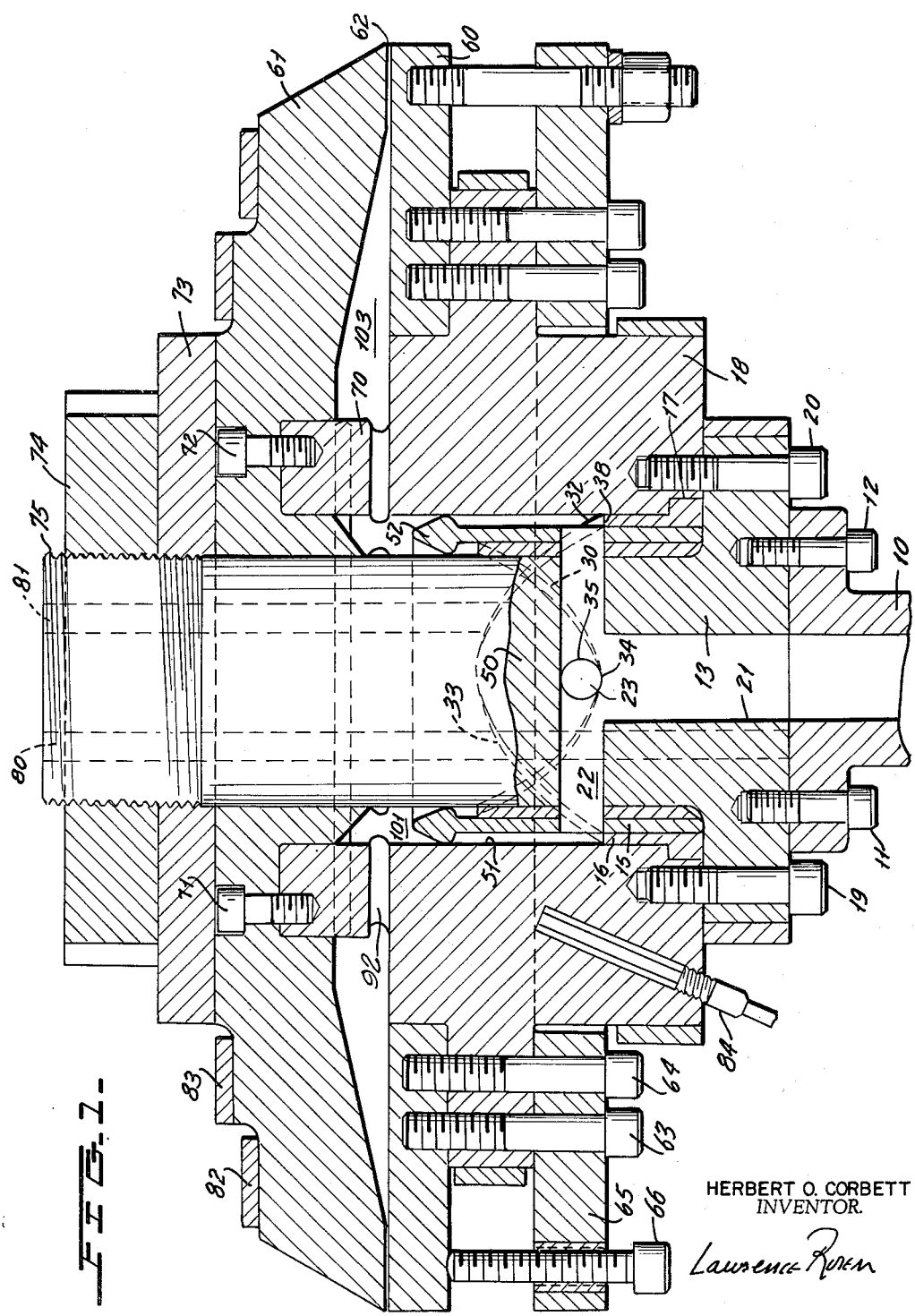

3,193,879
EXTRUSION DEVICE
Herbert O. Corbett, Canandaigua, N.Y., assignor to National Distillers and Chemical Corporation, New York, N.Y., a corporation of Virginia
Filed Oct. 23, 1962, Ser. No. 232,431
4 Claims. (Cl. 18—14)

This invention relates to a novel die for the extrusion of thermoplastic film, and more specifically relates to a novel die structure which redirects a flow of molten plastic so that it travels radially outward from a center line of the die where the flow of plastic is caused to have a plurality of radially directed overlapping streams which join in a seamless fashion.

Dies for the extrusion of thermoplastic materials such as polyethylene and polypropylene are well known to the art. In the past, such dies have been formed to have a central chamber which leads to an extruding orifice where two streams of molten plastic join in the chamber and are thereafter fed through the orifice. In such arrangements, it has been found that a seam is formed where the two streams of molten plastic join. This seam appears in the tube being extruded, and, thus, affects the appearance of the material, and also affects the roll geometry of a roll of the material.

In copending application, Serial No. 219,469, filed August 27, 1962, it is shown that this seam can be eliminated by causing the molten plastic to join over overlapping sections of relatively wide streams.

In the above noted application, the arrangement showing this broad concept was illustrated in conjunction with motion of the molten material in the direction of the axis of the extruding die. Where the die is of the type to generate a relatively large diameter plastic tube by causing a high divergence of the molten plastic to a large diameter ring opening which may be around the periphery of the die, it is necessary that the molten plastic be moved radially outwardly. Here, again, it was found that if individual streams of the molten plastic were caused to join at a discrete section, the undesirable seam is formed along the point where the streams join.

It has been found that a radially slotted ring with a plurality of radially extending slots adjacent one another in two planes which are axially spaced from one another can be formed. The slots of the upper plane of the ring are then caused to each overlap two adjacent slots of the slots in the lower plane whereby, when the plastic is extruded radially outwardly through the slots, the stream will rejoin as a plurality of individually overlapped streams, whereby all seam lines or weld lines are eliminated from the extruded bubble or tube.

Accordingly, a primary object of this invention is to provide a novel means for directing a flow of molten plastic radially outwardly toward a die opening without forming weld lines in the tube.

Another object of this invention is to provide a novel die plate structure which has a first and second plurality of radially extending slots in respective first and second parallel planes where any slot of the upper plane will overlie across two adjacent slots in the lower plane.

Another object of this invention is to provide a novel structure for the elimination of weld lines.

These and other objects of this novel invention will become apparent from the following description when taken in connection with the drawings, in which:

FIGURE 1 shows a side cross-sectional view of a die constructed in accordance with the present invention.

FIGURE 2 shows a fragmentary bottom plan view of the die of FIGURE 1.

FIGURE 3 shows a cross-sectional view of the radially slotted ring of FIGURE 1 which produces overlapping radially directed streams of flow.

FIGURE 4 is a front plan view of the ring of FIGURE 3.

FIGURE 5 is an exploded perspective view of the center post and tapered-cut rings for introducing an axial view of molten resin to the radial ring of FIGURE 3.

Referring first to FIGURE 1, the die assembly is carried on a support post 10 which is connected to any appropriate extruder which can deliver an appropriate molten polymer. Post 10 has openings therein that receive bolts such as bolts 11 and 12 (FIGURE 2) which are threadably received by a center post 13. The center post 13 then has a welded assembly of an inner ring 14, a choke ring 15 and an outer ring 16 clamped thereon by means of a shoulder 17 in the die body 18 which is fastened to center post 13 by the bolts such as bolts 19 and 20.

Referring to FIGURE 5 which shows the arrangement of center post 13 and rings 14, 15 and 16, it should be first observed from FIGURE 1 that center post 13 has an inner channel 21 which receives a flow of molten resin. The channel 21 then communicates with the channels 22 and 23 intermediate of center post 13, and which are perpendicular to the axis of channel 21.

The outer ring 16 and concentric inner ring 14 are similar in configuration, and, as shown in FIGURE 5, contain opposing tapered-cuts 30 and 31 for ring 14, and tapered-cuts 32 and 33 for ring 16.

The bottom section 34 of tapered-cut 30 is arranged to fall below outlet 35 of channel 23, while the bottom portion 36 of cut 31 falls below outlet end 37 of channel 23. In an identical manner, ring 16 which is concentric with ring 14 has the bottom portions 38 and 39 of cuts 32 and 33 respectively falling immediately below ends 40 and 41 respectively of channel 22. It will be noted that ring 14 has openings 40a and 41a in registry with ends 40 and 41 respectively to permit flow from channel 22 to ring 16. When the channels 22 and 23 are perpendicular with respect to one another, it will, therefore, be apparent that the rings 14 and 16 will be so aligned that the bottom portions of their respective tapered-cuts are rotated by 90° with respect to one another.

As illustrated in FIGURE 5, a choke ring 15 is interposed between rings 14 and 16. The center post 13 extends upwardly and is contained internally of the assembly of rings 14, 15 and 16.

The operation of the assembly of rings 14, 15 and 16 will be such that two sheets of molten plastic will flow out of ends 35 and 37 of channel 23, will flare out to follow the periphery of tapered-cut 30 and tapered-cut 31 respectively, while being contained between the outer surface of center post 13 and the inner surface of choke ring 15. In a similar manner, but rotated by 90°, two other sheets of molten plastic will be extruded in a form which is limited by the lips of cuts 32 and 33 and confined in thickness between the inner diameter surface 51 of die body 18 and the outer peripheral surface of choke ring 15.

These two sheets of plastic which necessarily overlap each other by 45° will then flow over the enlarged end portion 52 of choke ring 15 so as to join as a common circular sheet of molten plastic which moves axially with respect to the die where the joining of the various sheets occurs without the formation of weld lines.

While in many applications it is now possible to cause this axially directed tube of molten plastic to move directly upwardly through a ring-shaped orifice to be extruded as a tube, it is often desirable that a relatively large diameter tube be formed whereby it is necessary to move the molten resin radially of the die toward an enlarged finger-shaped opening.

This enlarged die opening is formed in FIGURE 1 by means of a lower lip ring 60, and an upper lip ring 61 which form an extrusion outlet orifice 62. The lower lip ring 60 is secured to die body 18 by means of bolts such as bolts 63 and 64 which pass through an adjustment support plate 65 and abutting screw means such as bolt 66 which is threadably received in plate 65 and abuts against the lower surface of lower lip ring 60.

The upper lip ring 64 is connected to a slotted ring 70 as by a ring of bolts such as bolts 71 and 72. The slotted ring 70 is illustrated in FIGURE 1 as being an upper integral extension of the die body 18. However, ring 70 could, if desired, be a separately machined ring.

A bolster plate 73 is then placed on top of the upper lip ring 61 and a nut 74 is then threaded on to the threaded end 75 of center post 13.

It will be further noted that FIGURE 1 shows the various auxiliary equipment normally used in such a die where, for example, a first and second air conduit 80 and 81 extend completely through center post 13 so that the tube being drawn can have air pressure injected therein in the usual fashion. In addition, heater bands such as bands 82 and 83 are placed throughout the die surface so that the die can be heated during operation. The usual thermocouple type pick-ups such as pick-up 84 can also be connected, as illustrated, in the die body 18.

Returning now to the specific arrangement of ring 70 and referring particularly to FIGURES 3 and 4, it will be observed that the ring 70 has a first and second series of slots 90 and 91 (FIGURE 4) which are in respective spaced parallel planes. More specifically, FIGURE 4 illustrates four slots 92, 93, 94 and 95 in plane 90 and similar slots 96, 97, 98, 99 and 100 in plane 91. The slots 92 through 100 communicate between channel 101 (FIGURE 2) which is at the end of choke ring 52 and the chamber 103 leading to outlet orifice 62.

It will be observed from FIGURE 4 that the channels of the two rings of channels overlap one another. By way of example, channel 93 is caused to overlap channels 97 and 98 in the adjacent lower ring of channels. Accordingly, as material is forced from annular chamber 101 into chamber 103, a plurality of overlapping radially directed streams of molten plastic will emerge into channel 103 to join in the channel without the formation of a weld line since there is no discrete line of joining in the extruded plastic tube.

FIGURES 3 and 4 further illustrate the streamlining and nesting between adjacent channels. For example, the channel 98 has extending sections 98a and 98b which are caused to overlap or nest with extending sections 97b and 99a respectively of adjacent channels 97 and 99 respectively. It has been found that such streamlining causes improved non-weld forming characteristics of the ring.

Although this invention has been described with respect to preferred embodiments thereof, many variations and modifications will now be obvious to those skilled in the art, and it is preferred, therefore, that the scope of this invention be limited not by the specific disclosure herein but only by the appended claims.

What is claimed is:

1. An extrusion die; said extrusion die comprising an upper lip ring, and a lower lip ring; said upper lip ring and lower lip ring being fixed in rigid spaced relationship with respect to one another to define a radially extending chamber terminating on an annular discharge orifice; a channel extending into the center of said radially extending chamber to conduct a mass of molten resin into said chamber, and a radial directing means interposed between said channel and the radially extending portions of said chamber; said radial directing means comprising a ring having a plurality of radially directed slots therein; adjacent slots of said radially directed slots overlapping one another to prevent formation of weld lines; said slots being arranged in first and second parallel spaced planes; each slot of each of said planes radially overlapping two adjacent slots of the other of said planes.

2. The device substantially as set forth in claim 1 wherein each of said adjacent slots are outwardly tapered and nested within one another.

3. The device substantially as set forth in claim 1 wherein said slots surround the axis of said extrusion die.

4. The device substantially as set forth in claim 1 wherein said slots are arranged in first and second parallel spaced planes; each slot of each of said planes radially overlapping two adjacent slots of the other of said planes; said slots of each of said first and second plane surrounding the axis of said die.

References Cited by the Examiner
UNITED STATES PATENTS

| | | | |
|---|---|---|---|
| 2,253,460 | 8/41 | Hempel | 18—30 |
| 2,669,750 | 2/54 | Kenney | 18—30 |
| 2,753,596 | 7/56 | Bailey | 18—14 |
| 3,020,588 | 2/62 | Ferguson et al. | 18—12 |
| 3,059,277 | 10/62 | Pierce et al. | 18—12 |
| 3,069,724 | 12/62 | Schiedrum | 18—14 |

MICHAEL V. BRINDISI, *Primary Examiner.*
ROBERT F. WHITE, *Examiner.*